(12) United States Patent
Ureche et al.

(10) Patent No.: US 8,914,874 B2
(45) Date of Patent: *Dec. 16, 2014

(54) COMMUNICATION CHANNEL CLAIM DEPENDENT SECURITY PRECAUTIONS

(75) Inventors: Octavian T. Ureche, Renton, WA (US); Alex M. Semenko, Issaquah, WA (US); Sai Vinayak, Redmond, WA (US); Carl M. Ellison, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1252 days.

This patent is subject to a terminal disclaimer.

(21) Appl. No.: 12/506,568

(22) Filed: Jul. 21, 2009

(65) Prior Publication Data

US 2011/0019820 A1    Jan. 27, 2011

(51) Int. Cl.
  G06F 21/00   (2013.01)
  G06F 21/60   (2013.01)
  H04L 9/32    (2006.01)
  H04L 29/06   (2006.01)

(52) U.S. Cl.
  CPC .......... *H04L 63/205* (2013.01); *H04L 2209/80* (2013.01); *G06F 21/606* (2013.01); *H04L 9/3247* (2013.01)
  USPC ............................................ 726/17; 713/189

(58) Field of Classification Search
  None
  See application file for complete search history.

(56) References Cited

U.S. PATENT DOCUMENTS

| 7,028,185 | B2 * | 4/2006 | Wheeler et al. ............... 713/170 |
| 7,509,250 | B2 | 3/2009 | Cruzado et al. |
| 7,516,495 | B2 | 4/2009 | Shoemaker et al. |
| 7,624,242 | B2 | 11/2009 | Savagaonkar et al. |
| 8,131,646 | B2 | 3/2012 | Kocher et al. |
| 8,296,564 | B2 | 10/2012 | Ureche et al. |
| 8,838,981 | B2 | 9/2014 | Ureche et al. |

(Continued)

FOREIGN PATENT DOCUMENTS

| CN | 1695339 | 11/2005 |
| CN | 101425902 | 5/2009 |
| KR | 1020070015671 A | 2/2007 |
| WO | WO-2005054973 | 6/2005 |

OTHER PUBLICATIONS

"Reflex Disknet PRO 4", Retrieved from http://www.checkpoint.com/reflexmagnetics/products/downloads/Reflex_Disknet_Pro_Brochure.pdf, (Aug. 2005),6 Pages.

(Continued)

*Primary Examiner* — Gilberto Barron, Jr.
*Assistant Examiner* — Simon Kanaan
(74) *Attorney, Agent, or Firm* — Timothy Churna; Kate Drakos; Micky Minhas (57) ABSTRACT

A set of security claims for a communication channel are obtained, the set of security claims including one or more security claims each identifying a security characteristic of the communication channel. The security claims are stored, as is a digital signature generated over the set of security claims by an entity. The security claims and digital signature are subsequently accessed when a computing device is to transfer data to and/or from the communication channel. The set of security claims is compared to a security policy of the computing device, and the entity that digitally signed the set of security claims is identified. One or more security precautions that the computing device is to use in transferring data to and/or from the communication channel are determined based at least in part on the comparing and the entity that has digitally signed the set of security claims.

20 Claims, 5 Drawing Sheets

(56) References Cited

U.S. PATENT DOCUMENTS

| | | |
|---|---|---|
| 2003/0177389 A1 | 9/2003 | Albert et al. |
| 2005/0005116 A1* | 1/2005 | Kasi et al. ............... 713/170 |
| 2005/0114672 A1 | 5/2005 | Duncan |
| 2005/0268327 A1 | 12/2005 | Starikov |
| 2006/0059537 A1 | 3/2006 | Alvermann et al. |
| 2006/0105741 A1 | 5/2006 | Suh et al. |
| 2006/0116208 A1 | 6/2006 | Chen et al. |
| 2006/0136986 A1 | 6/2006 | Doolittle |
| 2006/0156380 A1 | 7/2006 | Gladstone et al. |
| 2006/0250968 A1 | 11/2006 | Hudis et al. |
| 2007/0143823 A1 | 6/2007 | Olsen et al. |
| 2007/0156694 A1 | 7/2007 | Lim |
| 2007/0174919 A1 | 7/2007 | Raines et al. |
| 2007/0198853 A1* | 8/2007 | Rees ....................... 713/189 |
| 2007/0204335 A1 | 8/2007 | Zugenmaier et al. |
| 2007/0239953 A1 | 10/2007 | Savagaonkar et al. |
| 2008/0205647 A1 | 8/2008 | Zhang et al. |
| 2008/0263363 A1 | 10/2008 | Jueneman et al. |
| 2008/0270787 A1 | 10/2008 | LaCous |
| 2008/0276302 A1 | 11/2008 | Touboul |
| 2009/0070593 A1 | 3/2009 | Boshra et al. |
| 2009/0113202 A1 | 4/2009 | Hidle |
| 2009/0271586 A1 | 10/2009 | Shaath |
| 2009/0276534 A1 | 11/2009 | Jevans et al. |
| 2009/0300710 A1 | 12/2009 | Chai et al. |
| 2010/0211792 A1 | 8/2010 | Ureche |
| 2013/0007463 A1 | 1/2013 | Ureche et al. |

OTHER PUBLICATIONS

"Preventing Data Leaks on USB Ports", Retrieved from http://www.comnews.com/wp_library/Check%20Point%20USB%20leaks.pdf, (May 7, 2007),8 Pages.

"Control Removable USB Devices to Protect Data", Retrieved from http://www.lumension.com/usb_security.jsp_on_12/16/08., (Dec. 16, 2008),5 Pages.

Tharp, Tom "The Unique Benefits and Risks of USB Mass Storage Devices", Retrieved from http://www.itgi.org/Template.cfm?Section=Home&CONTENTID=35912&TEMPLATE=/ContentManagement/ContentDisplay.cfm_on_12/16/08., (2007),3 Pages.

Posey, Brien M., "Secure Removable Storage Devices via Group Policy in Vista", Retrieved from http://searchenterprisedesktop.techtarget.com.tip/0,289483,sid192_gci1257566,00.html_on_12/16/08., (May 31, 2007),4 Pages.

Posey, Brien M., "Prevent Removable Device Usage with Group Policy Settings", Retrieved from http://searchenterprisedesktop.teachtarget.com/tip/0,289483,sid192_gci1261751,00.html_on_12/16/08., (Jun. 21, 2007),3 Pages.

Piscitello, Dave "Security and USB Ports: Yet Another Access to Control", Retrieved from http://www.securityskeptic.com/usbaccesscontrol.htm_on_12/16/08., Core Competence, Inc.,(Aug. 25, 2004),5 Pages.

James, Mike "Stop the Drain", Retrieved from: <http://www.server-management.co.uk/features/112>_on_12/16/08., (Jan. 4, 2006),4 Pages.

Ravi et al., "Towards Securing Pocket Hard Drives and Portable Personalities", Retrieved at <<http://paul.rutgers.edu/~nravi/securesoul.pdf>>, IEEE Pervasive Computing, Special Issue on Security and Privacy, vol. 6, No. 4, Oct. 2007, pp. 6.

"RSA Expands Secure Access to Information With Two- and Threefactor Authentication Technology on Everyday Devices", Retrieved at <<http://www.rsa.com/press_release.aspx?id=7747, Feb. 5, 2007, pp. 3.

"USB 2.0 Seagate Secure™ hardware-based full-disc encryption technology", Retrieved at <<http://www.maxtor.com/content/data_sheet/en_blackarmor_ds.pdf>>, Black Armor Always encrypted Government-grade Secure portable storage, pp. 2.

"International Search Report", Mailed Date: Feb. 17, 2011, Application No. PCT/US2010/040732, Filed Date: Jul. 1, 2010, pp. 8.

"Notice of Allowance", U.S. Appl. No. 12/372,476, (Jul. 13, 2012), 11 pages.

"Foreign Office Action", Chinese Application No. 201080032992.6, (Feb. 25, 2013), 21 pages.

"Non-Final Office Action", U.S. Appl. No. 13/614,612, Nov. 27, 2013, 13 pages.

"Foreign Office Action", CN Application No. 201080032992.6, Sep. 4, 2013, 14 Pages.

"Foreign Office Action", CN Application No. 201080032992.6, Jan. 22, 2014, 10 pages.

"Foreign Office Action", CN Application No. 201080032992.6, May 14, 2014, 10 Pages.

"Notice of Allowance", U.S. Appl. No. 13/614,612, Jun. 6, 2014, 11 pages.

"Foreign Notice of Allowance", CN Application No. 201080032992.6, Oct. 13, 2014, 3 Pages.

* cited by examiner

COMMUNICATION CHANNEL CLAIM DEPENDENT SECURITY PRECAUTIONS

BACKGROUND

As computer technology has advanced and computers have become increasingly commonplace, the amount of data transferred electronically has also increased. Although such transfers can be very beneficial, they are not without their problems. One such problem is for a computer making a transfer to be able to trust that the data it transfers is protected in the manner the computer desires. Given the variety of different manners in which data can be transferred electronically, obtaining such trust can be difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a set of security claims for a communication channel is obtained, the set of security claims including one or more security claims each identifying a security characteristic of the communication channel. The set of security claims is compared to a security policy of the computing device. Additionally, an entity that has digitally signed the set of security claims is identified. One or more security precautions that the computing device is to use in transferring data to and/or from the communication channel are determined based at least in part on the comparing and the entity that has digitally signed the set of security claims.

In accordance with one or more aspects, a channel identifier of a communication channel is obtained. A set of security claims of the communication channel is also obtained, the set of security claims including one or more security claims each identifying a security characteristic of the communication channel. A digital signature over the set of security claims and the channel identifier is obtained from a trust authority. A channel security descriptor including the channel identifier, the set of security claims, and the digital signature is generated and stored.

BRIEF DESCRIPTION OF THE DRAWINGS

The same numbers are used throughout the drawings to reference like features.

DETAILED DESCRIPTION

Communication channel claim dependent security precautions are discussed herein. A communication channel has an associated set of one or more security claims that identify security or protection provided by the communication channel. A channel identifier and/or channel class identifier is also associated with the communication channel. The set of security claims, as well as one or both of the channel and channel class identifiers, is digitally signed by an entity. When determining whether to transfer data to and/or from the communication channel, a computing device analyzes the set of security claims, one or both of the channel and channel class identifiers, and the particular entity that generated the digital signature. Depending on this analysis, the computing device determines security precautions to take when transferring data to and/or from the communication channel.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key.

Figure 1:
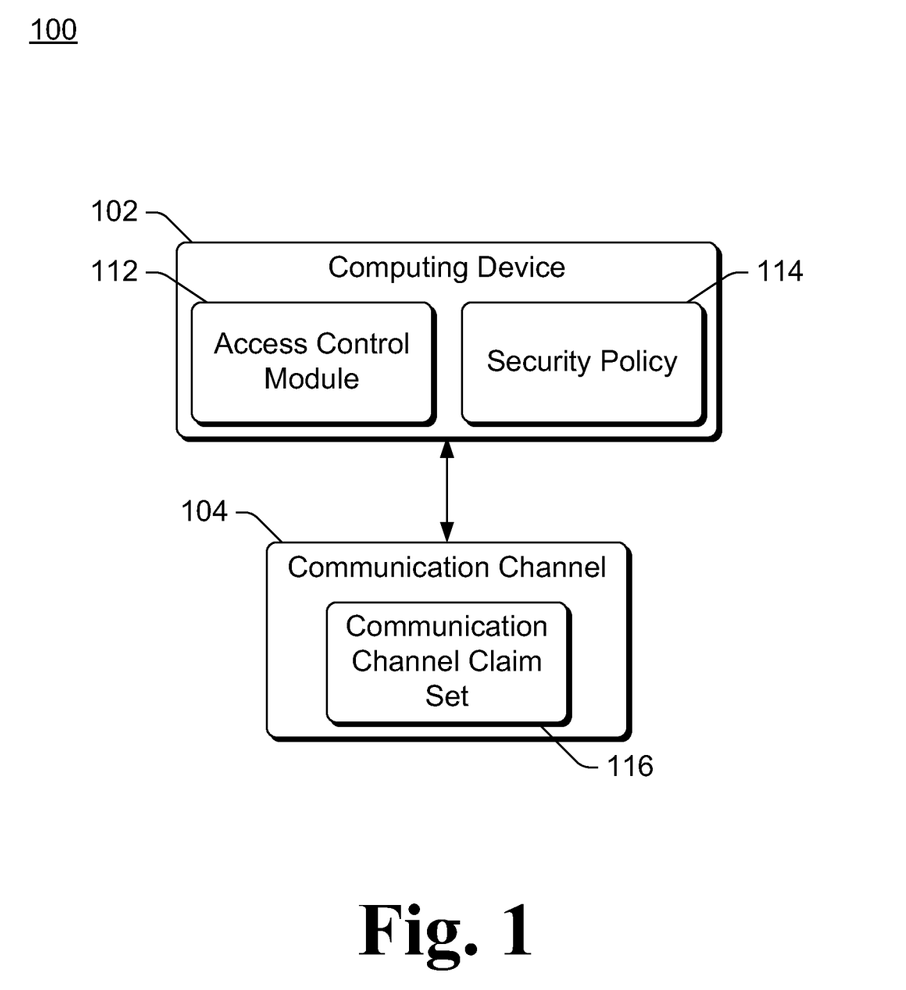
FIG. 1 illustrates an example system implementing the communication channel claim dependent security precautions in accordance with one or more embodiments.

FIG. 1 illustrates an example system 100 implementing the communication channel claim dependent security precautions in accordance with one or more embodiments. System 100 includes computing device 102 and a communication channel 104. Computing device 102 can transfer data to and/or from communication channel 104, allowing device 102 to store and retrieve data for later use, transfer data to other devices, and so forth. This data can take a variety of different forms, such as program instructions or code, data for programs, data representing pictures (or videos, music, etc.), other types of information, and so forth.

Computing device 102 can be a variety of different types of computing devices. For example, computing device 102 can be a desktop computer, a mobile station, a laptop or netbook, an entertainment appliance, a set-top box communicatively coupled to a display device, a cellular or other wireless phone, a personal digital assistant (PDA), a game console, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Communication channel 104 can be a variety of different classes or types of channels to which data can be transferred to and/or from. In one or more embodiments, communication channel 104 is a removable storage device, such as a flash memory device, a magnetic disk, an optical disc, and so forth. Such a removable storage device can be coupled to computing device in a variety of different wired and/or wireless manners. For example, a removable device can be coupled to device 102 via a Universal Serial Bus (USB) connection, a wireless USB connection, an IEEE 1394 connection, a Bluetooth connection, and so forth.

In embodiments where communication channel 104 is a removable storage device, such a removable storage device is typically a portable device that can be easily transported to different locations. This portability allows a user to easily move the device and connect the storage device to different computing devices. For example, such a removable storage device can be referred to as a thumb drive.

In other embodiments, communication channel 104 can take other forms, such as a communication conduit allowing signals or messages to be communicated between computing device 102 and another computing device (which can be any of a variety of different types of devices, analogous to the discussion above regarding device 102). A variety of different communication protocols can be used to establish such a communication conduit, such as the TLS (Transport Layer Security) protocol, the SSL (Secure Sockets Layer) protocol, other cryptographic or non-cryptographic protocols, and so forth. A communication conduit can be established via various communication links. For example, communication channel 104 can be a communication conduit established via a network such as the Internet, a local area network (LAN), a personal area network, a public telephone network, a cellular or other wireless phone network, and so forth. By way of another example, communication channel 104 can be a communication conduit established using other types of wired and/or wireless links coupling computing device 102 and another computing device, such as a USB connection, a wireless USB connection, an IEEE 1394 connection, a Bluetooth connection, and so forth.

Computing device 102 includes an access control module 112 and a security policy 114. Access control module 112 controls access to communication channel 104, and can be implemented in software, firmware, hardware, or combinations thereof. Security policy 114 identifies one or more security precautions that are to be enforced by access control module 112 in controlling access to communication channel 104. These security precautions can include a variety of different precautions, such as restrictions on whether communication channel 104 encrypts data, a manner in which communication channel 104 encrypts data, an entity that is responsible for managing or controlling communication channel 104, and so forth. These security precautions are discussed in more detail below.

Associated with communication channel 104 is a communication channel claim set 116. Claim set 116 identifies one or more security claims regarding communication channel 104, each security claim identifying a security characteristic of communication channel 104. A security characteristic describes one or more aspects of the security of channel 104. A variety of different aspects of the security of channel 104 can be described, such as whether communication channel 104 encrypts data received by channel 104, a type of encryption communication channel 104 uses to encrypt data received by channel 104 (e.g., Advanced Encryption Standard (AES), Data Encryption Standard (DES), Rivest Shamir Adleman (RSA), etc.), a source of a key used by the encryption algorithm of communication channel 104, a manner in which a key used by the encryption algorithm of communication channel 104 is generated, an entity that is responsible for controlling channel 104 (e.g., a device or module that establishes channel 104, an individual or group that physically carries and keeps track of channel 104, etc.), an agreement (such as a nondisclosure agreement) that is enforced by communication channel 104 in allowing data to be transferred to channel 104, a protocol used by communication channel 104 (e.g., Internet Protocol Security (IPsec), Secure Sockets Layer (SSL), Transport Layer Security (TLS), etc.), and so forth.

Communication channel claim set 116 can be stored on communication channel 104 or alternatively can be obtained from other sources. For example, claim set 116 can be obtained from another computing device, can be stored (e.g., maintained in a cache) of computing device 102, and so forth.

During operation, access control module 112 obtains communication channel claim set 116 and security policy 114. Module 112 compares claim set 116 to security policy 114 and determines what, if any, security precautions are to be taken by module 112 when transferring data to and/or from (e.g., writing data to and/or reading data from) communication channel 104. Additional information describing communication channel 104 and/or entities that are making the claims of claim set 116 can be analyzed by module 112 in determining what, if any, security precautions are to be taken by module 112 when transferring data to and/or from communication channel 104.

Figure 2:
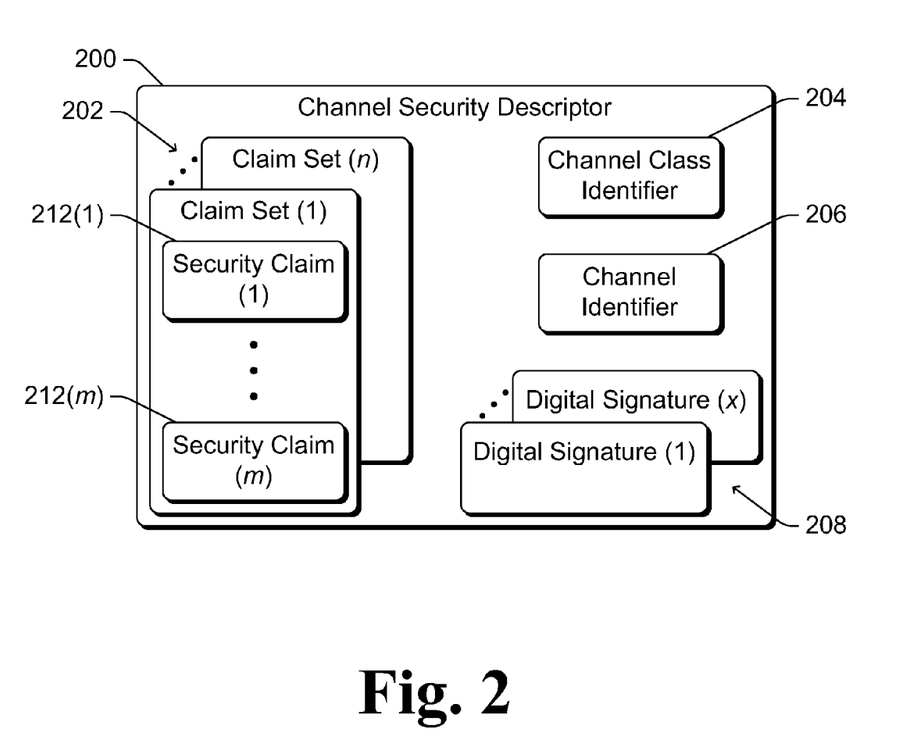
FIG. 2 illustrates an example communication channel security descriptor in accordance with one or more embodiments.

FIG. 2 illustrates an example communication channel security descriptor 200 in accordance with one or more embodiments. In such embodiments, each communication channel has an associated communication channel security descriptor 200. Security descriptor 200 can be stored on the associated communication channel, and/or stored separately (e.g., obtained from a different device, maintained by computing devices transferring data to and/or from the communication channel, and so forth).

Communication channel security descriptor 200 includes one or more (n) claim sets 202, a channel class identifier 204, a channel identifier 206, and one or more (x) digital signatures 208. Alternatively, one or more of claim sets 202, identifiers 204 and 208, and digital signatures 208 can be stored separately from descriptor 200. In other alternatives, one or more of claim sets 202, identifiers 204 and 208, and digital signatures 208 need not be used by the communication channel claim dependent security precautions discussed herein. For example, channel class identifier 204 may not be included in descriptor 200 or used by the communication channel claim dependent security precautions discussed herein.

Each claim set 202 includes one or more (m) security claims 212. Each claim set 202 can be, for example, a claim set 116 of FIG. 1. Each security claim 212 identifies a security characteristic of the associated communication channel as discussed above. Each claim set 202 is associated with an entity that is associated with the communication channel, such as a manufacturer of the communication channel, a distributor of the communication channel, a module or device that establishes the communication channel, an entity that controls the communication channel, and so forth.

Different entities can make different claims regarding security characteristics of the associated communication channel, and these are stored as different claim sets 202. For example, one entity can make a claim regarding the type of encryption that is used by the communication channel, while another entity can make a claim regarding the source of a key (or manner in which a key is generated) that is used by the communication channel for the encryption. By way of another example, one entity can make a claim regarding physical characteristics of the communication channel (e.g., that the communication channel is a wireless USB flash memory device), while another entity can make a claim regarding the type of encryption that is used by the communication channel.

Channel class identifier 204 is an identifier of a particular class or type of communication channel. Channel class identifier 204 allows different classes or types of communication channels to be distinguished from one another. As discussed above, a communication channel can be of different classes or types, each of which can be assigned a different channel class identifier. Different communication channels of the same class have the same class identifier 204. For example, one class identifier can be used for flash memory USB devices, another class identifier can be used for flash memory wireless USB devices, yet another class identifier can be used for an SSL communication conduit, and so forth.

Channel class identifier 204 can be obtained in a variety of different manners. If the communication channel is a removable storage device, then channel class identifier 204 can be an identifier of the class of the removable storage device that is included as part of the storage device when the storage device is created, an identifier that is stored on the storage device when the storage device is first used, an identifier that is stored on the storage device at other times, and so forth. If the communication channel is a communication conduit, then channel class identifier 204 can be an identifier derived from different parameters or characteristics of the communication conduit. For example, channel class identifier 204 can be obtained by determining the communication protocol used for the communication conduit, determining whether the communication conduit is a wired or wireless conduit, and so forth.

Channel identifier 206 is an identifier of a particular communication channel. Channel identifier 206 allows different communication channels to be distinguished from one another. Two different communication channels can have different channel identifiers 206 even though they may have the same channel class identifier 204.

Channel identifier 206 can be obtained in a variety of different manners. If the communication channel is a removable storage device, then channel identifier 206 can be an identifier of the removable storage device that is included as part of the storage device when the storage device is created, an identifier that is stored on the storage device when the storage device is first used, an identifier that is stored on the storage device at other times, and so forth. If the communication channel is a communication conduit, then channel identifier 206 can be an identifier derived from different parameters or characteristics of the communication conduit. For example, channel identifier 206 can be obtained by applying a particular algorithm to one or more encryption keys used as part of the communication conduit, to one or more configuration settings of the communication conduit, and so forth.

Each claim set 202 is certified by a particular trust authority. This certification for a claim set 202 is a certification by the trust authority that the one or more security claims 212 in that claim set 202 are true and accurate. In one or more embodiments, this certification is in the form of digital signatures 208. The trust authority generates a digital signature over the claim set 202 and stores the generated digital signature as a digital signature 208. The trust authority also typically generates the digital signature over channel class identifier 204 and/or channel identifier 206 as well. By digitally signing a claim set and an identifier 204 and/or 206, the claim set and identifier are bound together. This binding together allows a device verifying the digital signature to be assured that the communication channel having a particular identifier has the particular security characteristics included in the claim set.

A digital signature 208 is a digital signature generated using a private key of a public/private key pair of a particular entity. This entity can also be referred to as a trust authority because the digital signature is a certification by that entity that the information that is digitally signed can be trusted. Each digital signature 208 also typically includes or has associated therewith (e.g., included in a digital certificate that includes the digital signature) an identifier of the entity and/or a public key of the public/private key pair used to generate the digital signature 208. A variety of different entities can generate a digital signature, such as a manufacturer of the communication channel, a device establishing the communication channel, another trusted third party (e.g., a certification authority), and so forth. Regardless of the entity generating the digital signature, it is the responsibility of that entity to verify that the information (e.g., claim, identifier, etc.) being digitally signed is accurate.

When access to a communication channel is desired by a computing device, an access control module of the device (e.g., access control module 112 of FIG. 1) analyzes claim sets 202 as well as other information in channel security descriptor 200. This analysis is performed in light of a security policy of the device (e.g., security policy 114 of FIG. 1) that indicates security precautions that are desired by the access control module of the device. The security precautions that the access control module is to use can then be determined based on this analysis. Security precautions that are provided by the communication channel (as determined by the security claims) need not be duplicated by the access control module. For example, if the security policy indicates that encryption of data on the communication channel is desired, and a security claim indicates that the communication channel encrypts data it receives, then the access control module need not encrypt data before transferring it to the communication channel. However, if the security policy indicates that encryption of data on the communication channel is desired, and no security claim indicates that the communication channel encrypts data it receives, then the access control module encrypts data before transferring it to the communication channel.

Various analysis can be performed by the access control module of the device accessing the communication channel. This analysis can include, for example, analyzing the security claims in the claim set, analyzing the channel class identifier, analyzing the channel identifier, analyzing the digital signatures, and so forth.

In one or more embodiments, the access control module analyzes the digital signatures 208 and determines the security precautions it is to use based at least in part on this analysis. As part of analyzing the digital signatures 208, the digital signatures 208 can be verified. This verification can be performed using the public key of the entity that generated the digital signature as discussed above. If the digital signature is not verified, then the information that has been digitally signed is not trusted. However, if the digital signature is verified, then the information that has been digitally signed may or may not be trusted as discussed below.

Additionally, as part of analyzing the digital signatures 208 a determination can be made as to whether the entity that generated the digital signature is trusted, and/or how much the entity that generated the digital signature is trusted. The access control module can compare the entity that generated the digital signature to a list or other record of entities to determine a trust level for the entity. Different entities can have different trust levels. For example, some entities may be trusted enough so that the access control module trusts whatever information the entity has digitally signed. By way of another example, other entities may not be trusted so that the access control module does not trust any information the entity has digitally signed. By way of yet another example, yet other entities may be partially trusted so that the access control module trusts some information the entity has digitally signed but not other information (e.g., trusts the channel identifier that has been digitally signed, but does not trust a signed claim regarding a type of encryption that is performed).

The list or other record of entities and their trust level can be maintained in a variety of different locations. For example, the list or other record can be maintained as part of the security policy or alternatively maintained separately from the security policy.

In one or more embodiments, the access control module analyzes the channel class identifier 204 and determines the security precautions it is to use based at least in part on this analysis. As part of analyzing the channel class identifier, different security precautions can be desired for different channel classes. These different desired security precautions can be identified, for example, in the security policy accessed by the access control module. For example, the security policy can indicate that one type of encryption is desired for communication channels of a wireless USB flash memory device communication channel class, whereas another type of encryption is desired for communication channels of a wired USB flash memory device communication channel class.

In one or more embodiments, the access control module analyzes the claim sets 202 and determines the security precautions it is to use based at least in part on this analysis. As part of analyzing the claim sets, a determination is made as to whether a security claim in a claim set satisfies a security precaution in the desired security policy. A security claim satisfies a security precaution if the security claim indicates that the particular security indicated by the security precaution is provided by (or for) the communication channel. If a security claim set satisfies a security precaution in the desired security policy, then the access control module knows that the security precaution is handled by (or otherwise for) the communication channel and thus need not be performed by the access control module.

As part of analyzing the claim sets, the digital signature of the claim set is analyzed, including being verified, as discussed above. Additionally, as part of the analysis the access control module obtains the channel identifier of the communication channel and verifies both that the channel identifier of the communication channel is the same as channel identifier 206, and that the digital signature 208 binds the claim set 202 to the channel identifier 206. This verification assures the access control module that the security claims in the claim set are indeed the correct security claims (as digitally signed) for that communication channel.

Based on the analysis performed by the access control module, the access control module can readily identify both the desired security precautions for a particular communication channel and the security precautions that are already satisfied by the particular communication channel. Those security precautions that are not already satisfied by the particular communication channel are then used by the access control module in transferring data to and/or from the communication channel.

The analysis performed by the access control module can be performed in different manners. In one or more embodiments, the access control module begins its analysis with a list of security precautions that includes all of the desired security precautions for the communication channel. The security claims of the claim sets are analyzed and for each security claim that satisfies a desired security precaution, the satisfied desired security precaution is removed from the list. After the security claims of the claim sets are analyzed, the remaining list of security precautions is the list of security precautions used by the access control module in transferring data to and/or from the communication channel.

Alternatively, the security precautions used by the access control module can be identified in other manners. For example, the access control module can begin with an empty list of security precautions. The desired security precautions are analyzed and for each security precaution that is not satisfied by a security claim of a claim set, that desired security precaution is added to the list of security precautions. After the desired security precautions are analyzed, the list of security precautions is the list of security precautions used by the access control module in transferring data to and/or from the communication channel.

Figure 3:
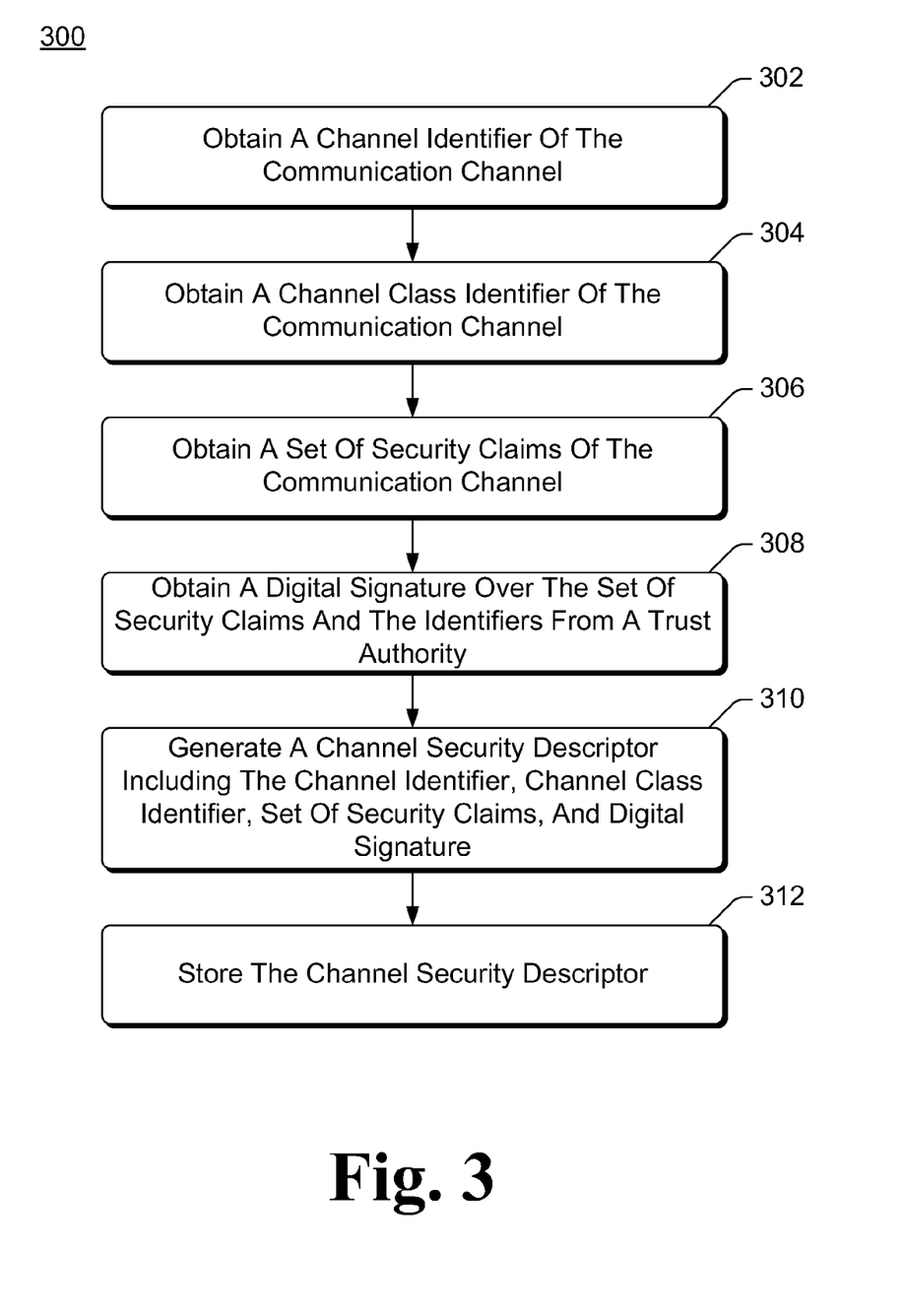
FIG. 3 is a flowchart illustrating an example process for creating a channel security descriptor in accordance with one or more embodiments.

FIG. 3 is a flowchart illustrating an example process 300 for creating a channel security descriptor in accordance with one or more embodiments. Process 300 is carried out by one or more computing devices, such as computing device 102 of FIG. 1 and/or another computing device, and can be implemented in software, firmware, hardware, or combinations thereof. Process 300 is shown as a set of acts and is not limited to the order shown for performing the operations of the various acts. Process 300 is an example process for creating a channel security descriptor; additional discussions of creating a channel security descriptor are included herein with reference to different figures.

In process 300, an identifier of a communication channel is obtained (act 302). This channel identifier can be obtained in different manners based on the particular communication channel as discussed above. For example, this channel identifier can be an identifier obtained from a removable storage device, an identifier generated based on one or more encryption keys used as part of a communication conduit, and so forth.

An identifier of a communication channel class is also obtained (act 304). This channel class identifier can be obtained in different manners based on the particular communication channel as discussed above. For example, this channel class identifier can be an identifier obtained from a removable storage device, an identifier obtained by determining the communication protocol used to establish a communication conduit, and so forth.

A set of one or more security claims for the communication channel is also obtained (act 306). This set of security claims can be obtained in a variety of different manners, such as being specified by a current user of the device implementing process 300, being specified by another component or module of the device implementing process 300, being specified by a current security policy of the device implementing process 300, being specified by another device, and so forth.

A digital signature over the set of security claims and the identifiers is obtained from a trust authority (act 308). This trust authority can be the device implementing process 300, or alternatively can be another device. This digital signature is generated using the private key of a public/private key pair of the device (or module or component thereof) generating the digital signature.

A channel security descriptor including the channel identifier, the channel class identifier, the set of security claims, and the digital signature is generated (act 310). Acts 302-308 can be repeated to generate additional sets of security claims that are included in the channel security descriptor.

The channel security descriptor is stored (act 312) for subsequent use. The channel security descriptor can be stored on the communication channel, or alternatively separately as discussed above.

It is to be appreciated that one or more acts of process 300 may not be performed. For example, act 304 may not be performed, in which case the digital signature generated in act 308 is generated over the channel identifier and the set of security claims but not the channel class identifier.

It should also be noted that acts 306 and 308 can be repeated multiple times (by the same computing device or different computing devices), and the resultant sets of security claims and digital signatures stored in the same channel security descriptor.

Figure 4:
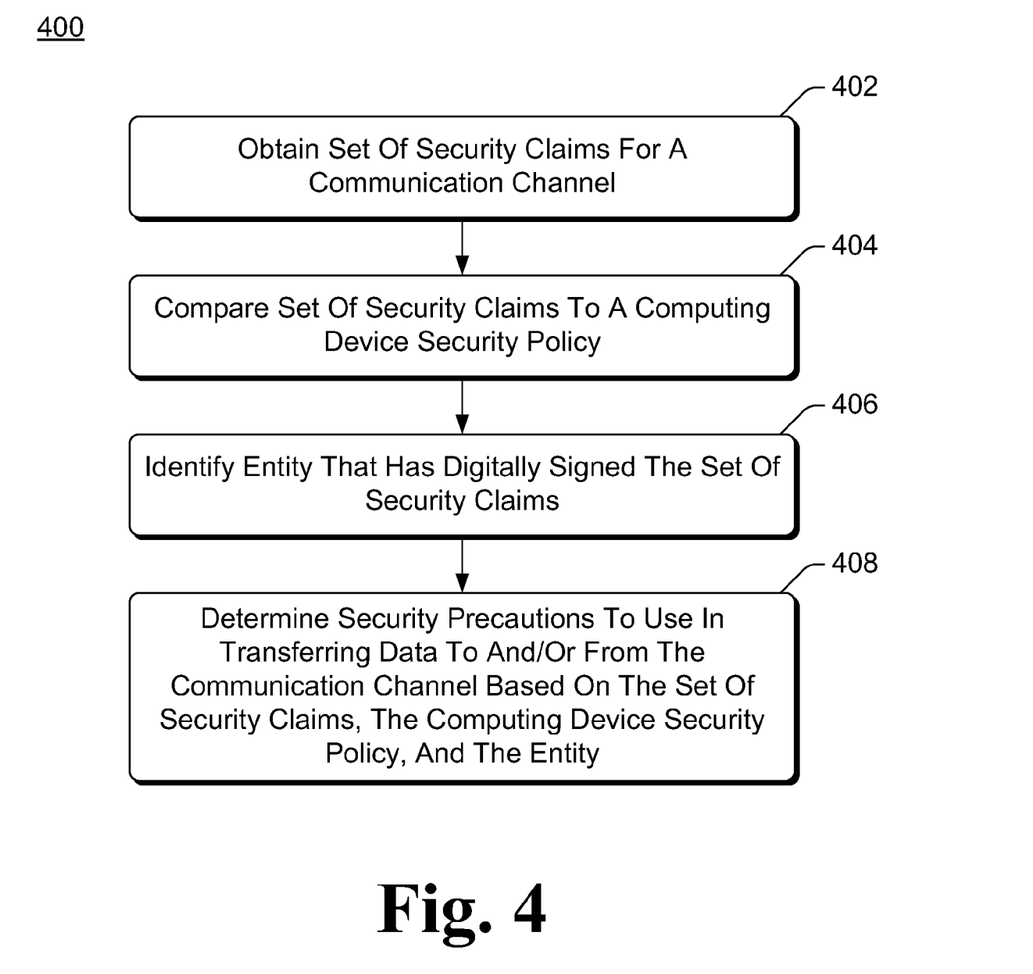
FIG. 4 is a flowchart illustrating an example process for determining a set of security precautions to use in transferring data to and/or from a communication channel in accordance with one or more embodiments.

FIG. 4 is a flowchart illustrating an example process 400 for determining a set of security precautions to use in transferring data to and/or from a communication channel in accordance with one or more embodiments. Process 400 is carried out by a computing device, such as computing device 102 of FIG. 1, and can be implemented in software, firmware, hardware, or combinations thereof. Process 400 is shown as a set of acts and is not limited to the order shown for performing the operations of the various acts. Process 400 is an example process for determining a set of security precautions to use in transferring data to and/or from a communication channel; additional discussions of determining a set of security precautions to use in transferring data to and/or from a communication channel are included herein with reference to different figures.

In process 400, a set of security claims for a communication channel is obtained (act 402). The set of security claims can be obtained from the communication channel or other components, modules, or devices as discussed above.

The set of security claims is compared to a security policy of the computing device implementing process 400 (act 404). This comparison includes identifying which security precautions of the security policy are satisfied by security claims of the set of security claims.

The entity that has digitally signed the set of security claims is also identified (act 406). This entity can be identified in different manners, such as from the digital signature as discussed above.

The security precautions (if any) to use in transferring data to and/or from the communication channel are determined based on the comparing of the set of security claims to the security policy of the computing device implementing process 400, and the entity that digitally signed the set of security claims (act 408). The determination in act 408 can also be based on additional analysis, such as analysis of a channel class identifier of the communication channel as discussed above.

The communication channel claim dependent security precautions discussed herein provides various usage scenarios. For example, the security policy of a computing device can indicate that a particular type of encryption is to be used for the communication channel. If no security claim in the claim set of the communication channel indicates that the particular type of encryption is used by the communication channel, then the computing device encrypts data transferred to (and decrypts data transferred from) the communication channel using that particular type of encryption. However, if a security claim in the claim set of the communication channel indicates that the particular type of encryption is used by the communication channel, then the computing device need not encrypt data transferred to (or decrypt data transferred from) the communication channel.

Continuing with this example, the security policy of the computing device can further indicate that if the communication channel is controlled by a particular individual or group, then no encryption need be used for the communication channel. If a security claim in the claim set of the communication channel indicates that the particular individual or group is controlling the communication channel, then the computing device need not encrypt data transferred to (and decrypt data transferred from) the communication channel regardless of whether the communication channel encrypts the data. If no security claim in the claim set of the communication channel indicates that the particular individual or group is controlling the communication channel, then data transferred to the communication channel is encrypted (and data transferred from the communication channel is decrypted) based on whether a security claim in the claim set indicates that the particular type of encryption is used by the communication channel as above.

By way of another example, the security policy of a computing device can indicate that a particular type of encryption is to be used for the communication channel, and that a key used for that particular type of encryption is to be generated by a trusted source. If a security claim in the claim set of the communication channel indicates that the particular type of encryption is used by the communication channel, and further indicates that the key used for that encryption is generated by a source that is on a list of entities that are trusted by the computing device, then the computing device can transfer data to and/or from the communication channel without encrypting data transferred to (and decrypting data transferred from) the communication channel. Otherwise, the computing device encrypts data transferred to (and decrypts data transferred from) the communication channel.

By way of yet another example, the security policy of a computing device can indicate that data transferred from a communication channel be subject to a particular contract or agreement that absolves the computing device (and/or user of the computing device) from any taint or other liability resulting from viewing data on the communication channel. If a security claim in the claim set of the communication channel indicates that such a contract or agreement is present, then the computing device can transfer data from the communication channel (assuming the remainder of the security policy is also satisfied). However, if no security claim in the claim set of the communication channel indicates that such a contract or agreement is present, then the computing device does not transfer data from the communication channel.

Figure 5:
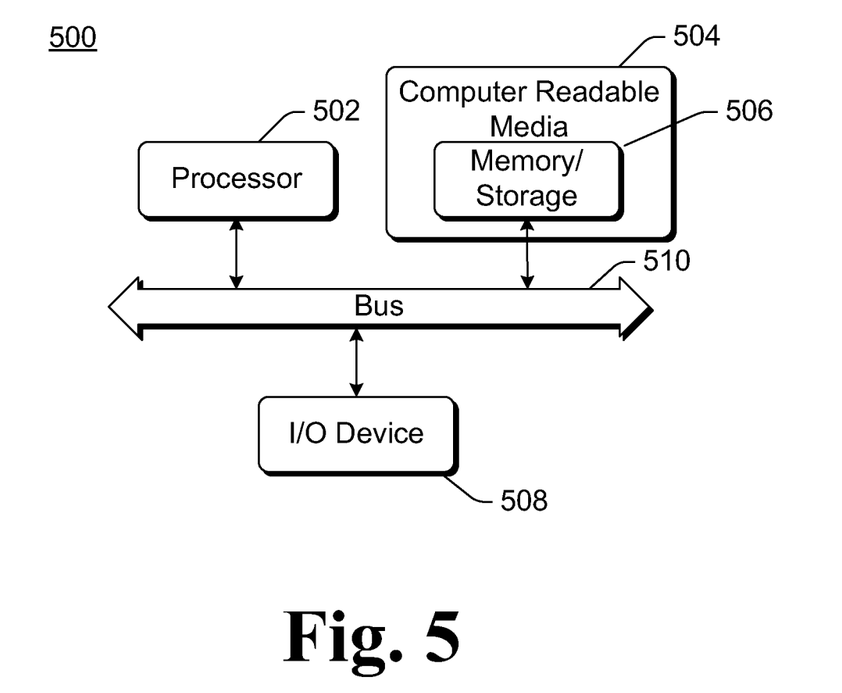
FIG. 5 illustrates an example computing device that can be configured to implement the communication channel claim dependent security precautions in accordance with one or more embodiments.

FIG. 5 illustrates an example computing device 500 that can be configured to implement the communication channel claim dependent security precautions in accordance with one or more embodiments. Computing device 500 can be, for example, a computing device 102 of FIG. 1, or another computing device implementing one or more of the techniques discussed herein.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Memory and/or storage components 506 can include, for example, a removable storage device (e.g., a communication channel 104 of FIG. 1). Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or non-volatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the communication channel claim dependent security precautions described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    responsive to the computing device desiring access to a communication channel device and prior to determining security precautions for use by the computing device and the communication channel device during a data transfer:
    obtaining a set of security claims for the communication channel device, the set of security claims including one or more security claims each identifying a security characteristic of the communication channel device;
    comparing the set of security claims for the communication channel device to a security policy of the computing device;
    identifying an entity that has digitally signed the set of security claims; and
    determining one or more security precautions that the computing device is to use in transferring data to and/or from the communication channel device, the determining being based at least in part on the comparing, the entity that has digitally signed the set of security claims, and a communication channel class identifier that has been digitally signed by the entity, the communication channel class identifier identifying a class of the communication channel device such that different communication channels of a same class share a same communication channel class identifier.

2. The method as recited in claim 1, wherein the security policy of the computing device indicates that data on the communication channel device is to be encrypted using a particular type of encryption, wherein the set of security claims indicates whether the communication channel device encrypts data using the particular type of encryption, and the determining comprises:
    determining that data transferred to the communication channel device is to be encrypted using the particular type of encryption if the communication channel device does not encrypt data using the particular type of encryption; and determining that data transferred to the communication channel device need not be encrypted if the communication channel device does encrypt data using the particular type of encryption as indicated by the set of security claims.

3. The method as recited in claim 1, wherein the security policy indicates that data on the communication channel device is to be encrypted using a particular type of encryption unless a particular entity is responsible for controlling the communication channel device, wherein the set of security claims indicates whether the particular entity is responsible for controlling the communication channel device, and the determining comprises:

determining that data transferred to the communication channel device is to be encrypted using the particular type of encryption if an entity responsible for controlling the communication channel device is not the particular entity; and determining that data transferred to the communication channel device need not be encrypted if the entity responsible for controlling the communication channel device is the particular entity.

4. The method as recited in claim 1, wherein the security policy indicates that the communication channel device is to enforce a particular agreement in allowing data to be transferred to the communication channel device, wherein the set of security claims indicates whether the communication channel device enforces the particular agreement, and the determining comprises:

determining that data can be transferred from the communication channel device if the communication channel device enforces the particular agreement; and determining that data is not to be transferred from the communication channel device if the communication channel device does not enforce the particular agreement.

5. The method as recited in claim 1, further comprising:

repeating the obtaining, comparing, and identifying for an additional set of security claims, the additional set of security claims and the set of security claims having been digitally signed by different entities; and wherein the determining is based at least in part on comparing the set of security claims to the security policy, comparing the additional set of security claims to the security policy, the entity that has digitally signed the set of security claims, and the entity that has digitally signed the additional set of security claims.

6. The method as recited in claim 5, wherein the set of security claims includes a security characteristic identifying a type of encryption that the communication channel device uses to encrypt data the communication channel device receives, and the additional set of security claims includes a security characteristic identifying a source of a key the communication channel device uses to encrypt data the communication channel device receives.

7. The method as recited in claim 1, wherein the determining is further based at least in part on verifying that the communication channel identifier that has been digitally signed by the entity with the set of security claims is the same as a communication channel identifier of the communication channel device.

8. The method as recited in claim 1, wherein security precautions satisfied by the set of security claims need not be included in the one or more security precautions that the computing device is to use in transferring data to and/or from the communication channel device.

9. A method implemented in a computing device, the method comprising:

obtaining a channel identifier of a communication channel, the communication channel comprising a communication channel device;

obtaining a set of security claims of the communication channel, the set of security claims including one or more security claims each identifying a security characteristic of the communication channel;

obtaining, from a trust authority, a digital signature over the set of security claims and the channel identifier;

generating a channel security descriptor including the channel identifier, the set of security claims, the digital signature, and a communication channel class identifier that has been digitally signed, the communication channel class identifier identifying a class of the communication channel device such that different communication channels of a same class share a same communication channel class identifier, the channel security descriptor available for analysis by the computing device when access to the communication channel is desired by the computing device; and storing the channel security descriptor.

10. The method as recited in claim 9, wherein storing the channel security descriptor comprises storing the channel security descriptor on the communication channel device.

11. The method as recited in claim 9, wherein the communication channel device is a removable storage device and the channel class identifier is an identifier of a class of removable storage devices.

12. The method as recited in claim 9, wherein the trust authority comprises the computing device.

13. The method as recited in claim 9, further comprising:

obtaining one or more additional sets of security claims of the communication channel;

obtaining, for each of the one or more additional sets of security claims, a digital signature over the additional set of security claims and the channel identifier; and wherein generating the channel security descriptor comprises generating the channel security descriptor including the channel identifier, the set of security claims, each of the additional sets of security claims, and the digital signatures.

14. The method as recited in claim 13, wherein the set of security claims includes a first security characteristic indicating a type of encryption the communication channel uses to encrypt data received by the communication channel, and wherein one of the additional sets of security claims includes a second security characteristic indicating a source of a key used by the communication channel to encrypt data received by the communication channel.

15. The method as recited in claim 9, wherein the set of security claims includes a security characteristic indicating a type of encryption the communication channel uses to encrypt data received by the communication channel.

16. The method as recited in claim 9, wherein the set of security claims includes a security characteristic indicating a particular entity that is responsible for controlling the communication channel.

17. The method as recited in claim 9, wherein the set of security claims includes a security characteristic indicating a particular agreement that the communication channel enforces in allowing data to be transferred to the communication channel.

18. The method as recited in claim 9, the set of security claims including a first security claim that indicates a particular group that controls the communication channel and a second security claim that indicates a type of encryption the communication channel uses to encrypt data received by the communication channel, and further comprising transferring data to the communication channel without encrypting the data.

19. The method as recited in claim 9, further comprising analyzing the channel security descriptor to determine a security precaution that the computing device is to use when the computing device accesses the communication channel.

20. One or more computer storage memories having stored thereon multiple instructions that, when executed by one or more processors of a computing device, cause the one or more processors to:
responsive to the computing device desiring access to a communication channel device and prior to determining security precautions for use by the computing device and the communication channel device during a data transfer:
obtain a set of security claims for the communication channel device, the set of security claims including one or more security claims each identifying a security characteristic of the communication channel device;
compare the set of security claims for the communication channel device to a security policy of the computing device;
identify an entity that has digitally signed the set of security claims; and
determine one or more security precautions that the computing device is to use in transferring data to and/or from the communication channel device, the determining being based at least in part on the comparing, the entity that has digitally signed the set of security claims, and a communication channel class identifier that has been digitally signed by the entity, the communication channel class identifier identifying a class of the communication channel device such that different communication channels of a same class share a same communication channel class identifier.

* * * * *